United States Patent [19]

Bottoms

[11] 4,317,409
[45] Mar. 2, 1982

[54] MUD PUMP PISTON ASSEMBLY

[76] Inventor: Clifford C. Bottoms, Rte. 2, Box 184L, McKinney, Tex. 75069

[21] Appl. No.: 126,339

[22] Filed: Mar. 3, 1980

[51] Int. Cl.³ .............................................. F16J 9/08
[52] U.S. Cl. ...................................... 92/244; 92/240; 92/258
[58] Field of Search ................ 92/240, 244, 144, 207, 92/259, 258, 249, 248; 277/212 C

[56] References Cited

U.S. PATENT DOCUMENTS

| | | | |
|---|---|---|---|
| 2,600,516 | 6/1952 | Pielop, Jr. | 92/244 X |
| 2,801,140 | 7/1957 | Kretzer | 92/244 |
| 2,987,354 | 6/1961 | Olson | 92/244 |
| 3,636,824 | 1/1972 | Clark | 92/249 |

FOREIGN PATENT DOCUMENTS 225627  12/1968  U.S.S.R. ................ 92/249

*Primary Examiner*—Irwin C. Cohen
*Attorney, Agent, or Firm*—Freilich, Hornbaker, Wasserman, Rosen & Fernandez

[57] ABSTRACT

A mud pump piston assembly is provided which facilitates replacement and secure holding of piston parts which wear rapidly. A hollow piston member which fits on the end of a piston rod to seal against the cylinder, is held in place by a thin pressure ring which is captured by a retainer ring lying in a groove around the piston rod. The piston member has a concave face and the thin pressure ring closely mates with the concave face to support it, while leaving most of the concave face of the piston member uncovered so it can be expanded by pressured mud to more completely seal against the cylinder. In one assembly, the retainer ring is formed with a circular cross section, and lies halfway within a groove of semicircular cross section while the pressure ring is formed of triangular shape and with one side of the triangle abutting the circular retainer ring at substantially the top of the groove. A double acting piston includes a wear ring located between a pair of piston members, wherein the wear ring can be easily replaced without removing any other part of the piston assembly and held against scoring of the cylinder, by utilizing two semicircular segments which are held by multiple screws in a groove of the piston rod.

1 Claim, 5 Drawing Figures

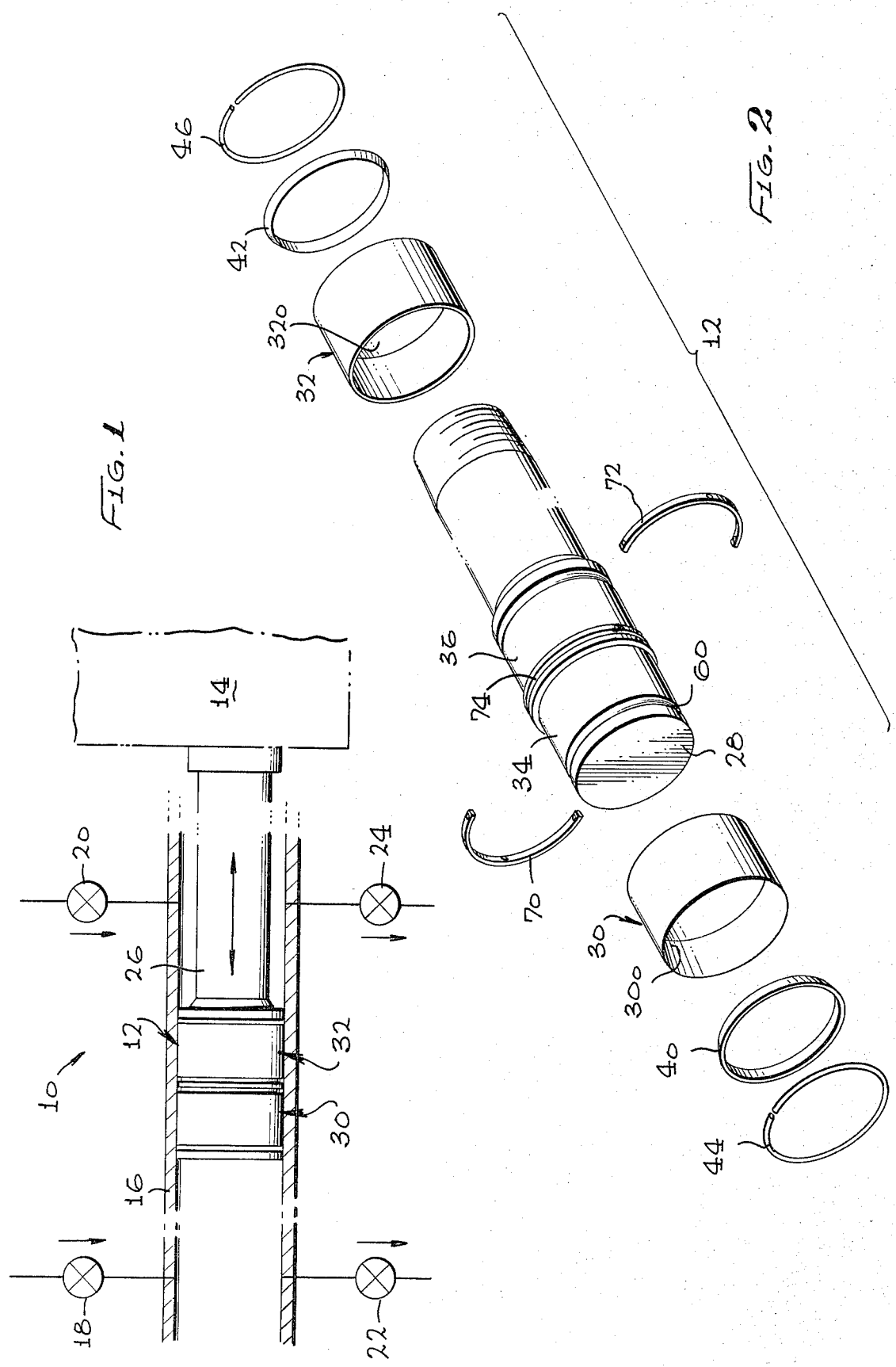

MUD PUMP PISTON ASSEMBLY

BACKGROUND OF THE INVENTION

Mud pumps utilized to pump drilling mud at high pressures such as about 2,000 psi, are subject to rapid wear. A commonly utilized type of piston assembly includes a steel rod which supports a hollow piston member formed of rubber or felt, to reciprocate in a steel cylinder. The piston member wears rapidly and must be replaced at frequent intervals. After some wear of the piston member, high pressure mud can squirt around it and past a steel shoulder on the piston rod which abuts one end of the piston member. To avoid costly damage to the shoulder, the shoulder is formed with a replaceable wear ring which is the first portion to wear and which prevents a portion of the shoulder which is integral with the rest of the piston from becoming worn.

The useful life of a piston member can be extended by forming the member so that it can expand somewhat to seal against the cylinder even after considerable wear. This can be accomplished by forming the cylinder member with a concave face which faces the high pressure mud being pumped, so that the mud tends to expand the cylinder radially outwardly. However, this construction of the piston face can also tend to cause pressured mud to be forced between the inside of the hollow piston member and the piston rod. Such leakage of pressured mud can be avoided by forming the piston member with a complex shape or by utilizing a very thick piston member and a large protective end plate. However, it would be desirable if a relatively narrow-walled piston member of relatively simple shape could be utilized, so that replaceable piston members could be constructed at low cost, especially if advantage is to be taken of better wearing but higher cost materials.

SUMMARY OF THE INVENTION

In accordance with one embodiment of the present invention, a mud pump piston assembly is provided which facilitates maintenance by facilitating replacement of wearing parts and minimizing their cost. The piston assembly includes a hollow piston member lying about a piston rod, with the piston member having one end supported by a shoulder on the rod and another end which is concave. A retainer ring lies in a groove near the concave end of the piston member, and supports the concave face of the piston member through a pressure ring. The pressure ring has one side formed to closely mate with the concave face of the piston member to support it, and has another end formed to be securely held by the retainer ring. The pressure ring is of relatively small radial thickness, so that it leaves most of the concave face of the piston member exposed to high pressure mud to facilitate expansion of the member near its concave face.

The piston member can be constructed of a high performance material such as Teflon, at moderate cost in spite of the high cost of such material. This is because a radially thin pressure ring which mates with the concave face of the piston member, can be made to effectively seal against the entrance of mud between the piston member and piston, so that a piston member of only moderate wall thickness can be utilized with most of its concave face exposed to the pressured mud. The retainer ring can be formed to block most of the area in front of the pressure ring to minimize the flow of mud tending to seep past the pressure ring. A retainer ring of circular cross section can be utilized which lies halfway within a piston groove of semicircular cross section, and the pressure ring can be formed of triangular shape, with a face of the triangle abutting the circular retainer ring at a location substantially even with the top of the groove.

The wear ring can be easily replaced by forming it into half-circle sections that can be separately installed in a groove formed in the piston. Each wear ring can be held tighly against the piston, to avoid contact with the cylinder and scoring of it, by utilizing a group of screws to hold each wear ring tightly in the piston rod groove.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified sectional view of a mud pump constructed in accordance with the present invention.

FIG. 2 is an exploded perspective view of the piston assembly of the mud pump of FIG. 1.

DESCRIPTION OF THE PREFERRED EMBODIMENT

Figure 3:
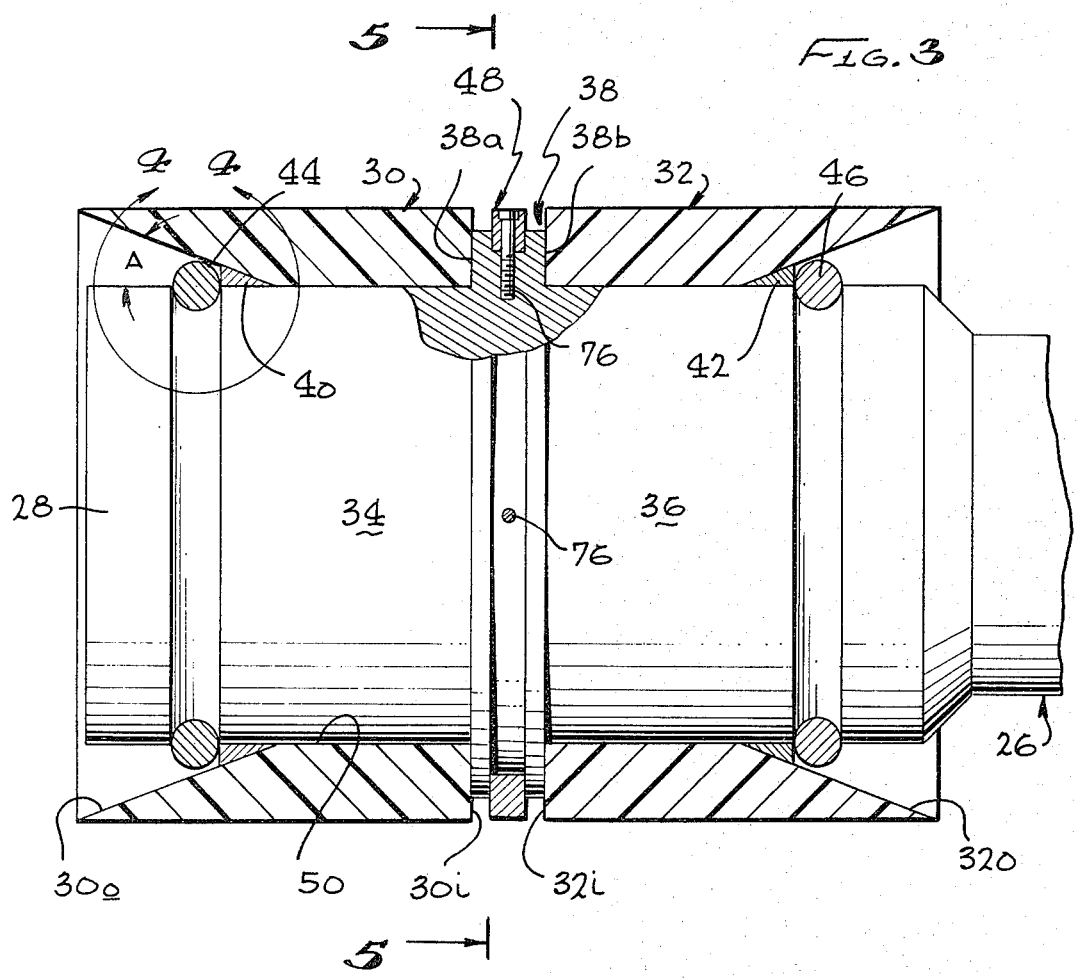
FIG. 3 is a sectional view of an end portion of the piston assembly of FIG. 2.

FIG. 1 shows a mud pump 10 of the present invention, which is utilized to pump drilling mud at high pressures such as a few thousand psi to aid in the drilling of deep wells. The pump includes a piston assembly 12 which is moved by an engine 14 to reciprocate within a cylinder 16. Drilling mud is pumped at low pressure into the piston through valves 18, 20 and is alternately pumped out of the piston through other valves 22, 24.

Figure 4:
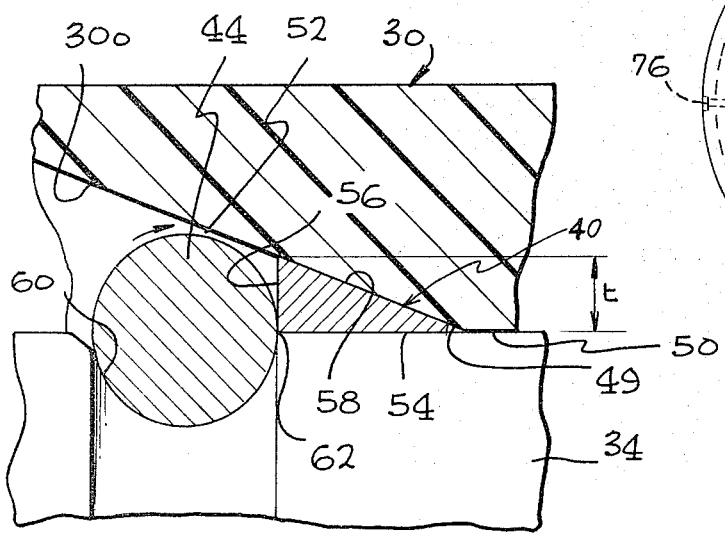
FIG. 4 is an enlarged view of the region 4—4 of FIG. 3.
Figure 5:
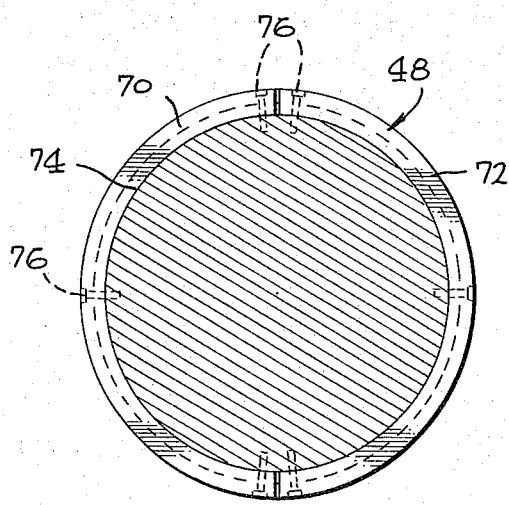
FIG. 5 is a view taken on the line 5—5 of FIG. 3.

As shown in the other FIGS. 2–5, the piston assembly 12 includes a piston rod 26 with an enlarged head portion 28 which is designed to receive a pair of piston members 30, 32. The piston members 30, 32 can be formed of conventional materials such as rubber or felt, although Teflon is preferred as will be described below. Each of the piston members 30, 32 (FIG. 3) lies closely around a portion 34 or 36 of the piston rod at the head portion thereof, and with an inner end 30*i*, 32*i* of each member abutting an end surface 38*a*, 38*b* of a shoulder 38 formed on the piston rod. The outer end 30*o*, 32*o* of each piston member which lies opposite the shoulder 38, is tapered at an angle A of less than 45° to form a highly concave end face. This enables mud pressure to expand the piston member and seal it tightly against the cylinder despite moderate wear of the piston member. The outer end of each piston member is held by a steel pressure ring 40, 42, with each pressure ring being held by an expandable retainer ring 44, 46.

The piston members 30, 32 used in high pressure mud pumps, are subject to rapid wear, so that they must be frequently replaced. The replacement of a piston member such as 30 is accomplished by spreading apart the ends of the retainer ring 44 to remove it, and then sliding off the continuous steel pressure ring 40 and then the piston member 30. Installation of a new piston member is accomplished in the reverse manner. If workmen wait too long before replacing worn piston members, then mud will leak around them, and the high pressured abrasive mud could wear the piston shoulder 38 if special precautions were not taken to prevent this. Since the shoulder 38 is not replaceable, wear of it must be avoided to avoid the need to replace the expensive rod 26. Wear of the shoulder 38 is avoided by the use of a wear ring 48 of larger diameter than the portion of the shoulder which is integral with the rest of the piston rod. Mud squirting past the piston members will wear the periphery of the wear ring 48, and the wear ring can be replaced if it is found to be worn. The wear ring 48 should be held at a smaller diameter than the piston members 30, 32, to avoid contact of the wear ring 48 with the cylinder walls, since such contact could wear or score the cylinder wall.

Efficient and reliable operation of the piston assembly requires that most of the concave outer end or face such as 30o of a piston member be exposed to high pressure mud to effectively expand the piston member, while the radially inner portion of the face is protected from the high pressure mud. Protection of the radially inner portion 49 (FIG. 4) of the piston member such as 30 is necessary to avoid the seepage of mud between the piston region 34 and the inner surface 50 of the piston member. The pressure ring 40 is formed to closely mate with the piston member face 30o at the radially inner portion 49, and to press thereagainst to avoid the passage of mud past the protection ring. The retainer ring 44 is formed to maintain pressure against the pressure ring 40. In addition, the retainer ring 44 helps block most of the space in front of the pressure ring 40, to minimize the force of high pressure mud on the pressure ring 40, and therefore to minimize the leakage of mud past the ring 40 as well as to minimize forcing of the ring 40 between the piston member and piston rod. The pressure ring 40 is exposed to the pressure of the mud due to the leakage of mud through the space 52 between the retainer ring and the piston member face 30o, but reduction of this passageway 52 minimizes the force of the pressured mud on the pressure ring as the piston is thrust forward to pump. The width of the passageway 52 between the periphery of the retainer ring and the piston member face 30o is narrower than half the radial thickness t of the pressure ring, to minimize forces on the pressure ring.

The pressure ring 40 is formed so it has a substantially triangular cross section, with an inner side or face 54 closely surrounding the piston rod portion 34, a forward face 56 extending perpendicular to the inner face 54, and an outer face 58 angled to match the taper angle of the piston member face 30. The retainer ring 40 is formed of circular cross section, and lies in a groove 60 formed in the piston rod which is of corresponding semicircular cross section. As a result, the pressure ring 40 abuts the retainer ring 44 at the top of the groove 60, at the point 62 where the surface of the retainer ring 44 is parallel to the forward face 56 of the pressure ring, to provide firm contact between the two rings 40, 44.

As mentioned above, the lifetime of a piston member such as 30 is prolonged by forming it with a concave outer face 30o to expand the piston member against the cylinder despite some piston member wear. In a typical piston pump with a piston member of about 6 inches outer diameter, a rubber or felt piston member needs to be replaced only after it is worn in diameter on the order of 80 mil (thousandths of an inch) which may occur after perhaps 50 hours of use. The lifetime of the piston member can be extended considerably, by utilizing a high performance material such as Teflon, which is highly resistant to the corrosive effects of the mud and which slides with minimal friction against mud particles. However, such a material is expensive so that its use is most economical where a piston member using a minimal amount of material can be utilized. Also, it is preferable that a piston member of such material be of a simple shape to facilitate manufacture by machining from a tube of the material. A piston member 30 of moderate wall thickness can be utilized in the present invention, by the use of the pressure ring 40 which is of small radial thicknesses t, and which is held by the slightly larger retainer ring 40, so that most of the thickness of the piston member is exposed to the pressured mud to be radially expanded by the mud. The triangular pressure ring 40 also permits a piston member 30 of relatively simple shape to be utilized, since the piston member 30 is basically a cylinder, with one end 30i perpendicular to the faces and the outer end 30o tapered. The machining of a short tube of material such as Teflon to this shape is relatively easy, and can be accurately performed on a simple lathe.

As mentioned above, the wear ring 48 (FIG. 3) is provided to avoid wear of the piston shoulder 38 due to the rapid leakage of mud past worn piston members. While the wear ring 48 is normally replaced at the same time as the piston members 30, 32, it is desirable to permit the wear ring to be replaced independently of the piston members. If, for example, a workman notices damage to the wear ring after he has replaced the piston members, he can easily replace the wear ring. Ease of replacement avoids a tendency to avoid replacement despite minor damage, which can result in damage to the shoulder 38. Replacement of the wear ring 48 is simplified by constructing it as two half rings 70, 72, which fit within a groove 74 in the piston at the shoulder 38. Each of the rings 70, is held in a simple manner, by the use of a group of bolts 76 that pass through the ring and into the piston. The half rings 70, 72 are formed so that their ends substantially abut one another when they are fastened in place. The wear ring segments are accurately formed and held, so that their outer diameter, when installed, is only slightly less than that of the cylinder. If the wear rings are permitted to touch the cylinder, they may score and therefore damage it. If the wear ring is considerably smaller than the cylinder, then mud leaking past a worn cylinder member will be able to squirt rapidly past the wear ring, and this rapid movement of mud will more quickly wear the piston member and wear ring. It should be noted that there is typically some wear on both the piston and wear ring by the time the piston member is replaced, and positioning of the wear ring only slightly away from the cylinder walls minimizes such wear and avoids damage to the piston assembly if workmen wait slightly too long before wear ring replacement.

Thus, the invention provides a mud pump piston assembly of relatively low cost, long life, and easy maintenance. The assembly utilizes a hollow piston member with a concave outer face which faces the high pressure mud being pumped, and with the member being held by a pressure ring which closely surrounds the piston and mates with the concave face of the piston member, and with the pressure ring being held by a retainer ring lying in a goove of the piston. The pressure ring is relatively thin, so that it leaves a majority of the concave face of the piston member exposed to the high pressure mud, to permit effective expansion of a worn piston member by the pressured mud. The pressure ring nevertheless effectively seals the radially inner portion of the piston member against the leakage of mud therein, utilizing a relatively thin pressure ring so that a piston member of relatively small wall thickness can be utilized to permit an expensive piston member material such as Teflon to be utilized. The pressure ring can be formed of triangular cross section, and can be held by a retainer ring of circular cross section which lies in a piston groove of semicircular cross section. A wear ring on the piston assembly can be easily replaced, by forming it of a plurality of circular segments such as two separate segments, which are each individually held by bolts to the piston.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A mud pump piston assembly comprising:

a piston rod having a shoulder and a groove spaced from the shoulder;

a hollow piston sealing member lying about said rod, said piston member having a first end supported by said shoulder and a second end lying adjacent to said groove;

a retainer ring lying in said groove;

a pressure ring lying closely between said second end of said piston member and said retainer ring, to support said second piston member end against said retainer ring;

said second end of said piston member forming a concave face, and the side of said pressure ring adjacent thereto being formed to closely mate with said concave face, but said pressure ring leaving most of the concave face of the piston member uncovered;

said retainer ring having a larger outside diameter than said pressure ring, and the periphery of said retainer ring lying adjacent to said concave face of said piston to leave a narrow passage between them which is narrower than half the radial thickness of the pressure ring.

* * * * *